(12) United States Patent
Futami et al.

(10) Patent No.: US 7,853,145 B2
(45) Date of Patent: Dec. 14, 2010

(54) OPTICAL SWITCH AND OPTICAL WAVEFORM MONITORING APPARATUS

(75) Inventors: Fumio Futami, Kawasaki (JP); Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 482 days.

(21) Appl. No.: 11/987,582

(22) Filed: Nov. 30, 2007

(65) Prior Publication Data

US 2008/0131138 A1    Jun. 5, 2008

(30) Foreign Application Priority Data

Nov. 30, 2006  (JP)  ............... 2006-323066

(51) Int. Cl.
*H04B 10/08* (2006.01)
*H04B 17/00* (2006.01)
*H04J 14/00* (2006.01)

(52) U.S. Cl. ......................................... 398/25; 398/45
(58) Field of Classification Search ............... 398/25, 398/45
See application file for complete search history.

(56) References Cited

U.S. PATENT DOCUMENTS 6,728,019 B2 * 4/2004 Usami et al. ............... 359/248
2006/0051100 A1 3/2006 Watanabe

FOREIGN PATENT DOCUMENTS

JP    2006-184851    7/2006

* cited by examiner

*Primary Examiner*—Shi K Li
(74) *Attorney, Agent, or Firm*—Staas & Halsey LLP

(57) ABSTRACT

According to an aspect of an embodiment, an optical switch comprises:
  a coupler for coupling a signal light and a control pulse;
  a first nonlinear medium for amplifying the signal light in accordance with the polarization direction of the control pulse light by nonlinear effect;
  a first polarizer outputting a component light in a signal light and the control pulse light in parallel with the transmission axis of the first polarizer;
  a second nonlinear medium for changing status of polarization of the signal light by nonlinear effect; and
  a second polarizer outputting a signal light and a control pulse light in parallel with the transmission axis of the second polarizer.

10 Claims, 10 Drawing Sheets

OPTICAL SWITCH AND OPTICAL WAVEFORM MONITORING APPARATUS

BACKGROUND OF THE INVENTION

The present art to optical switches extract part of signal light for output and optical waveform monitoring apparatuses monitor waveforms of light to be measured using the optical switches as optical sampling gates. In particular, the present art relates to an optical switch for extracting signal light by utilizing nonlinear effects caused by control light and an optical waveform monitoring apparatus.

There is a technique, as one of basic techniques for observing optical signals, in which optical signals are converted into electric signals using optical receivers and then the electric signals are observed on electrical oscilloscopes. FIG. 6 illustrates an example of an optical waveform monitoring apparatus which has been widely used. In the optical waveform monitoring apparatus illustrated in FIG. 6, light to be measured (optical pulse) is converted into an electric signal through a photoelectric converter 101. Then, an electrical sampling pulse generating circuit 103 generates an electrical sampling pulse in accordance with an electrical trigger generated by a trigger circuit 102. In accordance with the electrical sampling pulse, the electric signal from the photoelectric converter 101 is sampled in a sampling circuit 104, and a resultant sampling waveform is displayed on a waveform display 105. In such an optical waveform monitoring apparatus, the actual waveform of an optical signal is sampled using an electric signal for waveform monitoring. This configuration provides the optical waveform monitoring apparatus with high stability.

However, such a common optical waveform monitoring apparatus described above has a problem that the time resolution is limited by the bandwidths of the photoelectric converter 101, the trigger circuit 102, the sampling circuit 104, the waveform monitor 105, and so forth. In general, the operation bandwidth of an electronic circuit is approximately 40 gigahertz (GHz), and thus it is difficult to achieve a time resolution higher than 10 pico-seconds (ps).

To overcome the above problem, an optical sampling technique samples signal light without photoelectric conversion. In this optical sampling technique, as illustrated in FIG. 7 for example, an optical sampling gate 111 composed of a nonlinear medium generates intensity correlation signal light corresponding to light to be measured having a repetition rate of $f_0$ (wavelength: $\lambda s$) and an optical sampling pulse of which the pulse width is narrower than that of the light to be measured (wavelength: $\lambda c$), such that a sampling result is output. The intensity correlation signal light is herein referred to as light generated due to overlap of the light to be measured and the optical sampling pulse in the time domain.

Specifically, in the above configuration example illustrated in FIG. 7, a short pulse light source 112 is driven by a sampling frequency signal supplied from a sampling frequency generator 113, so that an optical sampling pulse can be obtained as output of the short pulse light source 112. In the sampling frequency generator 113, a clock signal at a frequency of $f_0$ synchronized with the light to be measured is frequency-divided by N and is frequency-shifted by a frequency $\Delta f$ for sweep, and a signal at the resulting frequency ($f_0/N+\Delta f$) is output as a sampling frequency signal.

Then, the optical sampling pulse and the light to be measured are multiplexed in the optical sampling gate 111 and input to the nonlinear medium of the optical sampling gate 111, and as a result a nonlinear effect is produced. Through this nonlinear effect, an optical signal having signal having an intensity correlation between the light to be measured and the optical sampling pulse, i.e., intensity correlation signal light (repetition rate: $f_0/N+\Delta f$) can be obtained. This intensity correlation signal light is extracted through an optical filter and output from the optical sampling gate 111.

The intensity correlation signal light output from the optical sampling gate 111 is converted into an electric correlation signal in the photoelectric converter 114. The converted signal is usually analog-digital converted using a sampling frequency signal and then input to a vertical axis signal port of the waveform display 115 as an intensity correlation signal converted into an electric signal. In the waveform display 115, a sweep signal at a frequency of $\Delta f$ used in the sampling frequency generator 113 is input to a horizontal axis signal port and triggered, such that the waveform of the intensity correlation signal input to the vertical axis signal port is displayed.

Since the time resolution of the optical sampling described above depends principally on the pulse width of an optical sampling pulse, optical sampling with a high time resolution can be realized by preparing an optical sampling pulse having a narrow pulse width. With this arrangement, a time resolution sufficient to monitor a signal light waveform having a bit late of 40 gigabit/second (Gb/s) or higher can be achieved.

Optical sampling gates used in the above optical sampling technique have been developed. For example, an optical sampling gate configured to have an optical switch is proposed, as illustrated in FIG. 8 (see, for example, Japanese laid-open Patent No. 2006-184851, Japanese laid-open Patent No. 2006-194842 and S. Watanabe, et al., "Novel Fiber Kerr-Switch with Parametric Gain: Demonstration of Optical Demultiplexing and Sampling up to 640 Gb/s," ECOC. 2004, Th4. 1.6).

In the optical switch in FIG. 8, signal light (light to be measured) having a wavelength of $\lambda s$ and control light (optical sampling pulse) having a wavelength of $\lambda c$ which is different from the signal light, are input to a directional coupler through respectively corresponding polarization controllers 121 and 122, respectively. Then, light multiplexed by the directional coupler 123 is supplied to a nonlinear medium 124. At this time, the polarization direction of the signal light to be input to the nonlinear medium 124 is controlled by the polarization controller 121 to be orthogonal to a transmission axis of a polarizer 125 arranged downstream of the nonlinear medium 124, as illustrated in the left side of FIG. 9. In addition, the polarization direction of the control light to be input to the nonlinear medium 124 is controlled by the polarization controller 122 to be angled at 40 to 50 degrees with respect to the polarization direction of the signal light.

When no control light pulse is present, as illustrated in the lower left portion of FIG. 9, the signal light input to the nonlinear medium 124 passes through the nonlinear medium 124 while maintaining the polarization state of incident light. Thus the input signal light is intercepted by the polarizer 124 having a transmission axis perpendicular to the polarization direction. On the other hand, when a control light pulse is present, as illustrated in the upper right portion of FIG. 9, the signal light is optical-parametric amplified in the polarization direction of the control light by the effect of four-wave mixing. Four-wave mixing is generated selectively with respect to signal light having the same polarization component as control light. Thus, when the peak power of a control light pulse is sufficiently large, the polarization direction of the signal light which has been optical-parametric amplified in the nonlinear medium 124 is approximately the same as the polarization of exciting light. Therefore, an optical signal component, among components of the signal light emitted from the nonlinear medium 124, which is parallel to the transmission axis of the polarizer 125 is transmitted through the polarizer 125. Then, the transmitted light from the polarizer 125 is supplied to a wavelength filter 126 to extract light having a wavelength of λs, such that signal light switched in accordance with the control light is output from the wavelength filter 126.

According to the optical switch described above, increased switching efficiency can be realized as compared with a known optical Kerr switch (for example, see K. Kitayama et al., "Optical sampling using an all-fiber optical Kerr shutter," Appl. Phys. Lett., vol. 46, pp. 623-625, 1985.) by exploiting the optical parametric amplification effect, which is produced due to four-wave mixing in the nonlinear medium 124. It is also advantageous that it is not necessary to highly precisely control the power of control light as in the case of the optical Kerr switch.

SUMMARY

According to an aspect of the embodiment, an optical switch comprises:

a coupler for coupling a signal light and a control pulse light which is different in wavelength and polarization direction from the signal light, the coupler outputting the signal light multiplexed the control pulse light;

a first nonlinear medium for transmitting the signal light outputted from the coupler and the control pulse light outputted from the coupler, the first nonlinear medium for amplifying the signal light in accordance with the polarization direction of the control pulse light by nonlinear effect;

a first polarizer positioned after the first nonlinear medium, the first polarizer having a transmission axis which is orthogonal with the polarization direction of the signal light before transmitting the first nonlinear medium, the first polarizer outputting a component light in a signal light and the control pulse light in parallel with the transmission axis of the first polarizer;

a second nonlinear medium for transmitting the signal light outputted from the first polarizer and the control pulse light outputted from the first polarizer, the second nonlinear medium for changing polarization stats of the signal light by nonlinear effect; and a second polarizer positioned after the second nonlinear medium, the second polarizer having a transmission axis in accordance with a changing status angle of the second nonlinear medium, the second polarizer outputting a signal light and a control pulse light in parallel with the transmission axis of the second polarizer.

DETAILED DESCRIPTION OF THE INVENTION

Figure 8:
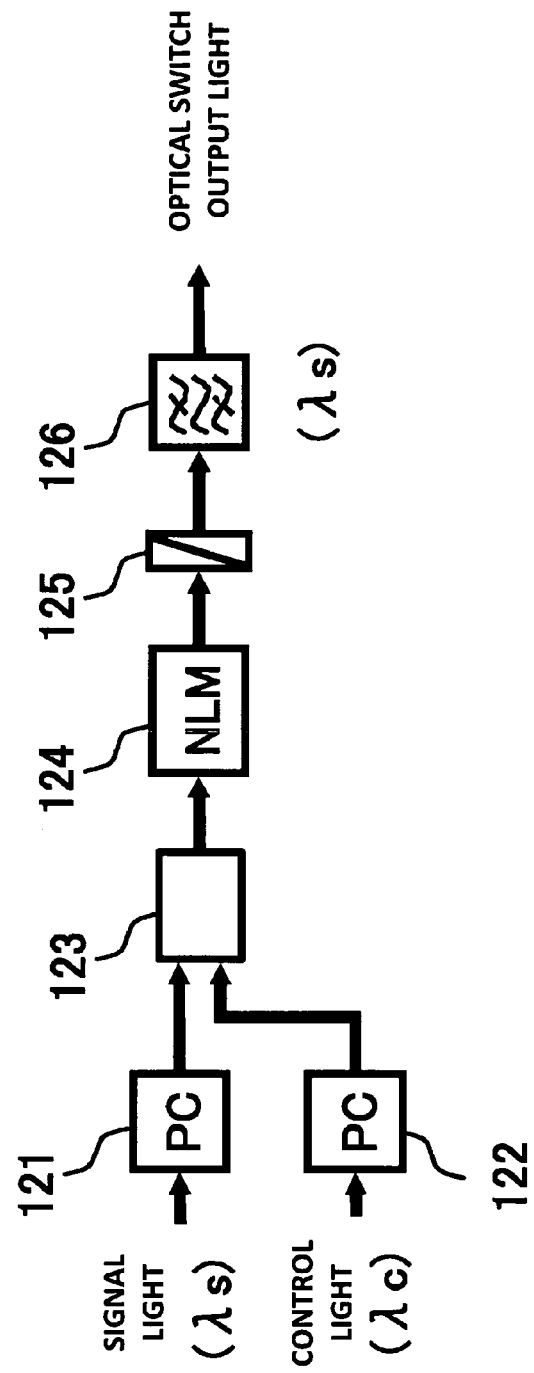
FIG. 8 is a diagram illustrating an example of a configuration of a conventional optical switch used as an optical sampling gate in FIG. 7.
Figure 9:
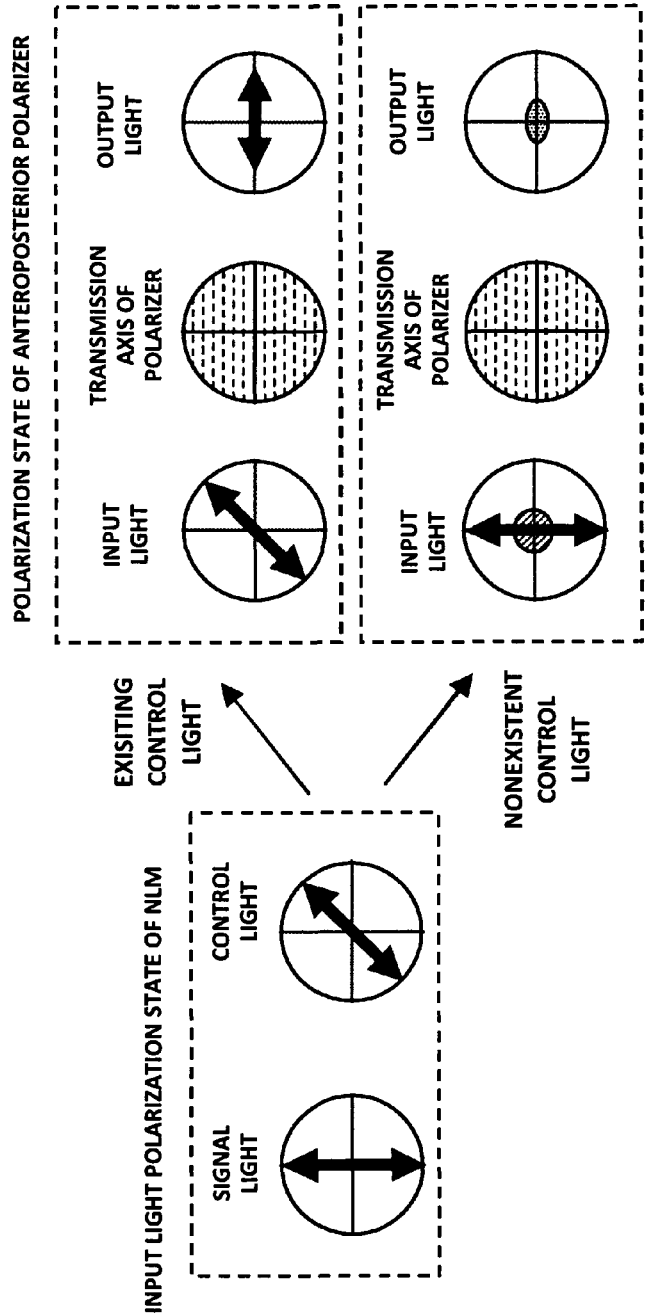
FIG. 9 is a diagram illustrating an operation of the optical switch in FIG. 8.

However, a conventional optical switch as illustrated in FIG. 8 has a problem that noise components are generated due to factors such as the performance limitation of a polarizer, which results in degradation of switch characteristics.

Specifically, in the above conventional optical switch, it is ideal that no light component transmits through a polarizer when no control optical pulse is present. However, in actual implementation, a significant amount of light components transmit through a polarizer due to fluctuation of signal light input to the optical switch, polarization mode dispersion (PMD) of a nonlinear medium, wavelength dependency of transmission characteristics of a polarizer, or the like. As a result, noise components are generated.

Figure 10:
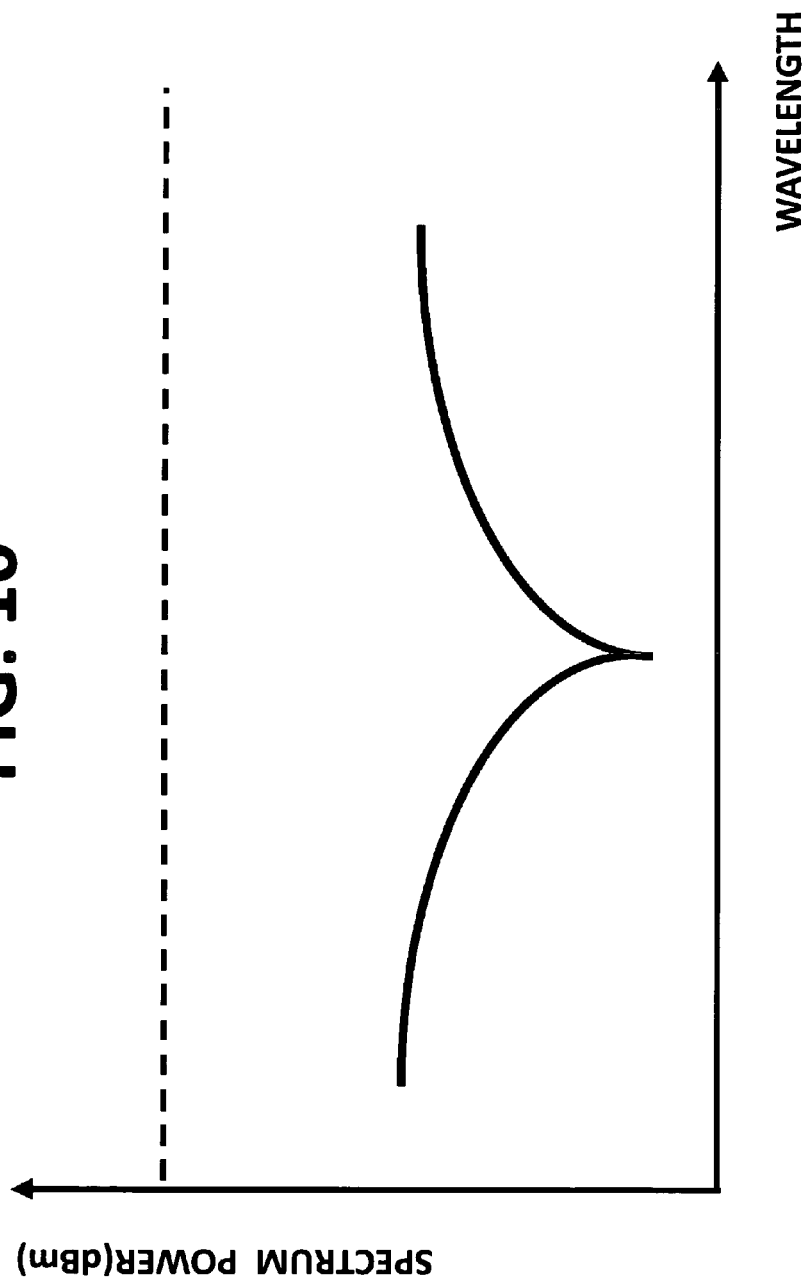
FIG. 10 is a diagram illustrating an example of an output light spectrum in the optical switch in FIG. 8 when no control light pulse is present.

FIG. 10 shows an example of a spectrum of light transmitted through a polarizer in a case where no control light pulse is present. The power of the transmission light is minimized at a predetermined wavelength. A light component with a wavelength around the predetermined wavelength does not substantially transmit through the polarizer. However, the power of the transmission light increases as the wavelength deviates from the predetermined wavelength, which results in generation of noise components. Thus, the configuration of the conventional optical switch has a technical limitation in terms of suppression of noise components in the absence of control light pulse and a problem in view of a signal light extinction ratio (a ratio of an optical power with signal light output to a power of noise light without signal light output). If an optical waveform monitoring apparatus is prepared using such a conventional optical switch as an optical sampling gate, noise components described above affect a monitored waveform of light to be measured, making it difficult to highly precisely monitor the waveform of light to be measured.

The embodiment has been made in view of the above circumstances. Accordingly, an object of the embodiment is to realize an optical switch which can reliably suppress noise components generated in the absence of control light pulse. Another object of the embodiment is to provide an optical waveform monitoring apparatus capable of highly precisely monitoring a waveform of light to be measured by employing the optical switch as an optical sampling gate.

In the following, the preferred embodiments will be described with reference to the attached drawings. The same reference numerals will be used throughout the drawings to refer to the same or like parts.

Figure 1:
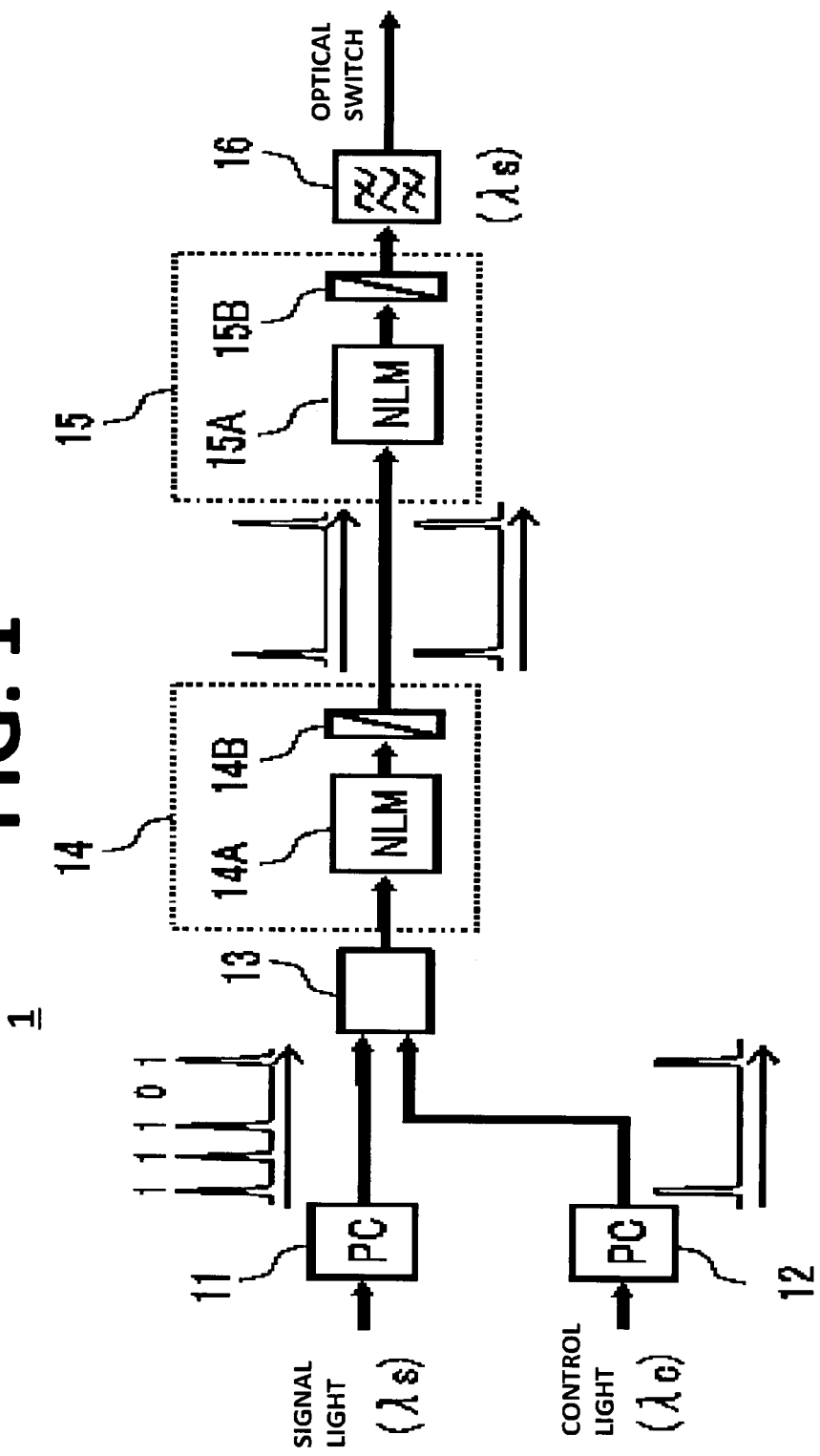
FIG. 1 is a diagram illustrating a configuration of an optical switch according to an embodiment.

FIG. 1 is a block diagram illustrating a configuration of an optical switch according to an embodiment.

In FIG. 1, an optical switch 1 according to the embodiment has, for example, a first polarization controller (PC) 11 for receiving input of signal light, a second polarization controller 12 for receiving control light, a directional coupler 13 serving as a multiplexer for multiplexing the signal light and the control light output from the first and second polarization controllers 11 and 12, respectively, a first optical switching unit 14 receiving input of light output from the directional coupler 13, a second optical switching unit 15 serially connected to the first optical switching unit 14, and a wavelength filer 16 receiving input of light output from the second optical switching unit 15.

The first polarization controller 11 controls a polarization state of input signal light. That is, the first polarization controller 11 linearly polarizes signal light in a predetermined direction. Specifically, the polarization direction of the signal light is controlled so as to be orthogonal to a direction of a transmission axis of a polarizer 14B in the first optical switching unit 14, which will described below. It is herein assumed that the signal light has a wavelength of $\lambda s$ and is composed of an optical pulse train as indicated in the upper left of FIG. 1.

The second polarization controller 12 controls a polarization state of input control light and sets the polarization direction of the control light to be angled at 40 to 50 degrees (preferable, 45 degrees) with respect to the polarization direction of the signal light controlled by the first polarization controller 11. It is herein assumed that the wavelength of the control signal is $\lambda c$ and this wavelength $\lambda c$ is appropriately separated from the wavelength $\lambda s$ of the signal light. In addition, the waveform of the control light has a pulse waveform of which the repetition rate is lower than that of the signal light, for example, as indicated in the lower left of FIG. 1. Further, the peak power of the control light pulse is adjusted to a level that allows the signal light to be optical-parametric amplified through four-wave mixing (FWM) produced in a nonlinear medium (NLM) 14A in the first optical switching unit 14, which will be described below, as well as to rotate the polarization direction of the signal light through cross phase modulation (XPM) produced in a nonlinear medium 15A in the second optical switching unit 15, which will be described below. In this specification, definition of the rotate is to change status of the polarization of the signal light.

The directional coupler 13 multiplexes the signal light from the first polarization controller 11 and the control light from the second polarization controller 12 and outputs the multiplexed light to the first optical switching unit 14.

The first optical switching units 14 and 15 have the above-mentioned nonlinear media 14A and 15A, respectively, and the above-mentioned polarizers 14B and 15B, respectively. The nonlinear media 14A and 15A serve to produce a non-linear optical effect using the signal light and the control light multiplexed in the directional coupler 13. Each of the nonlinear media 14A and 15A may be implemented, for example, as a step-index optical fiber used in optical fiber transmission. This optical fiber has been in wide use and can thus be implemented at a low cost. In addition, it is also possible to use step-index silica fiber, in which a nonlinear coefficient is increased by changing a refractive index profile to reduce an effective core cross-sectional area and doping germanium in a core to increase the nonlinear refraction index, and a photonic crystal fiber, in which a nonlinear coefficient is increased by realizing a effective core cross sectional area which is so small as cannot be realized by the step index optical fiber. Further, it is also possible to use an optical fiber having a high nonlinearity which is composed of a material whose nonlinear refraction index is greater than silica. Implementation of an optical fiber with an increased nonlinear coefficient can reduce an optical fiber length required to efficiently generate intensity correlation signal light, and thus a compact and stable optical switch can be realized. In addition, it is also possible to use, as the nonlinear media 14A and 15A, an optical waveguide such as periodically poled lithium niobate (PPLN) or the like having a pseudo phase-matching structure or an optical crystal such as KTP, or a semiconductor device such as gallium aluminum arsenide (GaAlAs).

The polarizers 14B and 15B serve to extract a specific linear polarization component from optical components in which a nonlinear effect is produced in the individual nonlinear media 14A and 15A. Specifically, it is possible to use a polarization beam splitter (PBS), an optical crystal with birefringence, etc. Note that the direction of the transmission axis of the polarizer 14B in the upstream side is set to be orthogonal to the polarization direction of signal light input to the nonlinear medium 14A. In other words, the polarization controller 11 described above controls the polarization direction of the signal light to be orthogonal to the polarization axis of the polarizer 14B. In addition, the direction of the transmission axis of the polarizer 15B in the downstream side is set to be orthogonal to the transmission axis of the polarizer 14B in the upstream side.

The wavelength filter 16 receives input of light transmitted through the polarizer 15B of the second optical switching unit 15. The wavelength filter 16 extracts from the input light a component which is the same as the wavelength $\lambda s$ of the signal light and outputs the extracted component.

Figure 2:
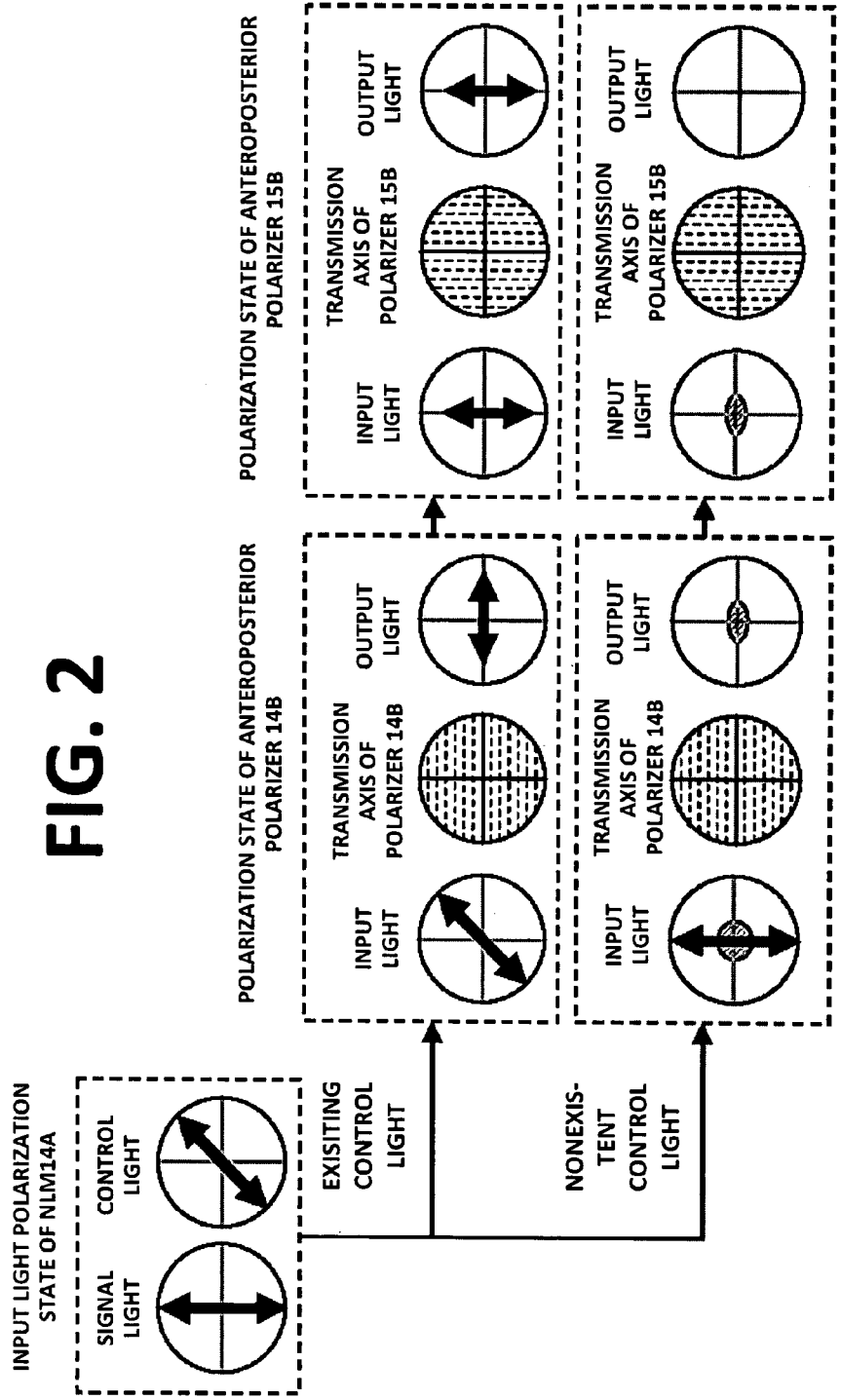
FIG. 2 is a diagram illustrating an operation of the above embodiment.

Next, an operation of the optical switch 1 having the above configuration will be described with reference to FIG. 2.

In the optical switch 1 of the embodiment, signal light of which the polarization direction is controlled by the polarization controller 11 so as to be orthogonal to the transmission axis of the polarizer 14B and control light of which the polarization direction is controlled by the polarization controller 12 so as to be angled at 40 to 50 degrees with respect to the polarization direction of the signal light are multiplexed in the directional coupler 13 and input to the nonlinear medium 14A of the first optical switching unit 14. The polarization states of the signal light and the control light are illustrated in the upper left block of FIG. 2.

In the nonlinear medium 14A, no linear optical effect due to the signal light and the control light is produced when no control light pulse is present. Thus, input signal light passes through the nonlinear medium 14A while basically maintaining the polarization state. Therefore, the polarization state of the signal light input to the polarizer 14B is a linear polarization state in which the polarization direction of the signal light is perpendicular to the transmission axis of the polarizer 14B, as indicated by an arrow shown in the left side in the lower center block of FIG. 2. On the other hand, noise components generated due to fluctuation of the signal light, polarization mode dispersion (PMD) of the nonlinear medium 14A, or the like are in a non-polarization state, as indicated by the shaded circle shown in the left side in the lower center block of FIG. 2. Thus, a component among the noise components in a non-polarization state which is parallel to the transmission axis transmits through the polarizer 14B while the signal light linearly polarized perpendicularly to the transmission axis does not transmit through the polarizer 14B. Therefore, the noise components are output from the polarizer 14B as indicated by a shaded ellipse shown in the right side in the lower center block of FIG. 2. Then, the noise components passes through the nonlinear medium 15A of the second optical switching unit 15 and are input to the polarizer 15B while maintaining the same polarization state as it had when output from the polarized 14B. However, since the direction of the transmission axis of the polarizer 15B is set to be perpendicular to the main polarization direction of the input noise components, the above noise components hardly transmit the polarizer 15B as indicated in the lower right block of FIG. 2. Therefore, when no control light pulse is present, the signal light and the noise components are substantially intercepted by the two-stage optical switching units 14 and 15.

On the other hand, when a control light pulse is present, signal light input to the nonlinear medium 14A of the first optical switching unit 14 is optical-parametric amplified in the polarization direction of the control light through four-wave mixing caused by the control light, and intensity correlation signal light is generated. Thus, the polarization state of the signal light input to the polarizer 14B of the first optical switching unit 14 is a linear polarization state in which the polarization direction of the signal light is angled at 40 to 50 degrees with respect to the transmission axis of the polarizer 14B, as indicated by an arrow shown in the left side in the upper center block of FIG. 2. Since a component in the linearly polarized signal light which is parallel to the transmission axis transmits through the polarizer 14B, the signal light in a polarization state illustrated in the arrow shown in the right side in the upper center block of FIG. 2 is output from the polarizer 14B. In addition, part of the control light input to the nonlinear medium 14A passes through the nonlinear medium 14A and is input to the polarizer 14B, and a component in the control light which is parallel to the transmission axis is output from the polarizer 14B. Then, the signal light and the control light transmitted through the polarizer 14B are input to the nonlinear medium 15A of the second optical switching unit 15. Due to the effect of cross phase modulation (XPM) produced in the nonlinear medium 15A, the polarization direction of the signal light is rotated by a predetermined angle (for example, approximately 90 degrees), as in the operation principle of a known optical Kerr switch. Therefore, the polarization state of the signal light to be input to the polarizer 15B of the second optical switching unit 15 is a linear polarization state in which the polarization direction of the signal light is generally parallel to the transmission axis of the polarizer 15B, as indicated by the arrow shown in the left side in the upper block of FIG. 2. Thus, the signal light transmits through the polarizer 15B and then output after unnecessary components, which are other than components of wavelength λs, are removed by the wavelength filter 16 in the subsequent stage.

Now, generation of an intensity correlation signal by the above nonlinear medium 14A will be described in detail.

One of nonlinear effects produced in the nonlinear medium 14A is four-wave mixing effect with ultrafast response time. Four-wave mixing is a phenomenon in which when pump light having a wavelength equal to a zero dispersion wavelength of the nonlinear medium 14A and signal light of which the wavelength is different from that of the pump light are input to the nonlinear medium 14A, a third light, i.e., idler light, is generated. Since the intensity of idler light is proportional to the product of the square of the peak power of the pump light and the peak power of the signal light, intensity correlation signal light can be optically obtained owing to the four-wave mixing effect.

In response to an increase in the intensity of the pump light, an optical parametric amplification phenomenon simultaneously occurs. That is, the energy of the pump light is distributed to the signal light and the third idler light so that the intensity correlation signal light can be obtained efficiently. This amplification phenomenon similarly occurs to the signal light. That is, when this amplification component can be separated from the signal light input to the nonlinear medium 14A, the intensity correlation signal light having the same wavelength as the wavelength of the input signal light can be obtained.

For example, in a case where switching of signal light in the entire bandwidth of the C-band is performed, the pump light needs to be set out of the C-band, and consequently, the idler light is generated out of the C-band. Thus, in order to employ this light as intensity correlation signal light, optical parts for a bandwidth out of the C-band are necessary, which leads to an increase in the cost for an optical switch. In view of this, it is important to obtain the intensity correlation signal light having the same wavelength as that of the signal light.

In this situation, the above-described separation is possible by using an optical Kerr switch utilizing an optical Kerr effect, which is another nonlinear effect. An optical Kerr switch is composed of a nonlinear medium and a polarizer, in which the polarization state of signal light is set so that the signal light input to the switch does not transmit through the polarizer. That is, when linearly polarized control light (pump light) angled at 40 to 50 degrees, preferably 45 degrees, with respect to the polarization of the signal light is input to a nonlinear medium, the polarization state of the signal light is changed due to the control light, and only intensity correlation signal light components pass through the polarizer. Thus, intensity correlation signal light having the same wavelength as the input signal light can be obtained in the first optical switching unit 14 by applying the optical Kerr switch.

Further, in the configuration of the optical switch 1 of the embodiment, a component parallel to the transmission axis among components of the control light whose energy has decreased due to the generation of the intensity correlation signal light in the nonlinear medium 14A also passes through the polarizer 14B. The component is then input together with the intensity correlation signal light to the nonlinear medium 15A of the second optical switching unit 15 in the subsequent stage. The power of the control signal at this time is preset to a level that allows the polarization state of the intensity correlation signal light to be rotated by approximately 90 degrees through cross phase modulation (XPM) produced in the nonlinear medium 15A. This allows the polarization direction of the intensity correlation signal light to be generally parallel to the transmission axis of the polarizer 15B. Thus, the intensity correlation signal light having the same wavelength as the input signal light is output from the polarizer 15B, only when a control light pulse is present.

Figure 3:
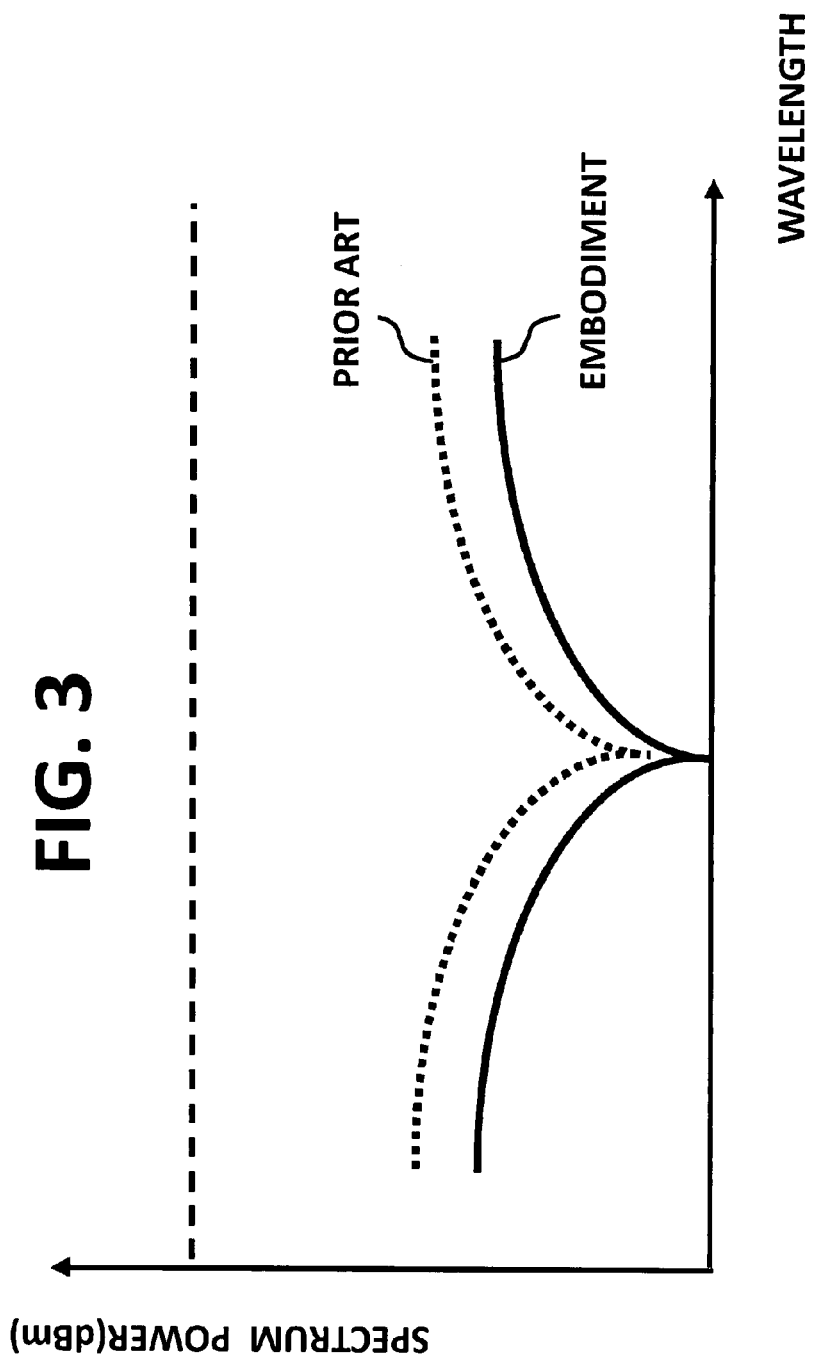
FIG. 3 is a diagram illustrating an example of an output light spectrum when no control light pulse is present according to the above embodiment.

According to the operation principle described above, the optical switch 1 can output signal light on which ON/OFF switching is performed in accordance with the presence or absence of a control light pulse, while suppressing noise components generated in the OFF state. FIG. 3 illustrates an example of a comparison between the spectra of the output light of the optical switch 1 in the absence of control light pulse and the output light of the above-described conventional optical switch illustrated in FIG. 10. According to the optical switch 1, it is possible to reduce the noise level throughout the entire operable wavelength bandwidth more than in the case of the conventional optical switch. Thus, an optical extinction ratio of the signal light, which is a ratio of a signal light power in the ON state to a noise light power in the OFF state, can be improved, and thus an optical switch having enhanced performance can be realized.

In the above optical switch 1 according to the first embodiment, the polarization controller 11 is set so that the polarization direction of signal light input to the nonlinear medium 14A is orthogonal to the direction of the transmission axis of the polarizer 14B of the first optical switching unit 14, and the polarization controller 12 is set so that the polarization direction of control light is angled at 40 to 50 degrees with respect to the polarization direction of the signal light. However, it can also be configured such that for example, the power of light output from the second optical switching unit 15 or the wavelength filter 16 is monitored and feedback control is performed on each of the polarization controllers 11 and 12 so that the polarization states of the signal light and the control light are optimized on the basis of a monitoring result. This configuration can realize stable switch characteristics which are not dependent of the polarization state of signal light input to the optical switch of the embodiment.

In the following, an embodiment of an optical waveform monitoring apparatus using the above optical switch according to the embodiment will be described.

Figure 4:
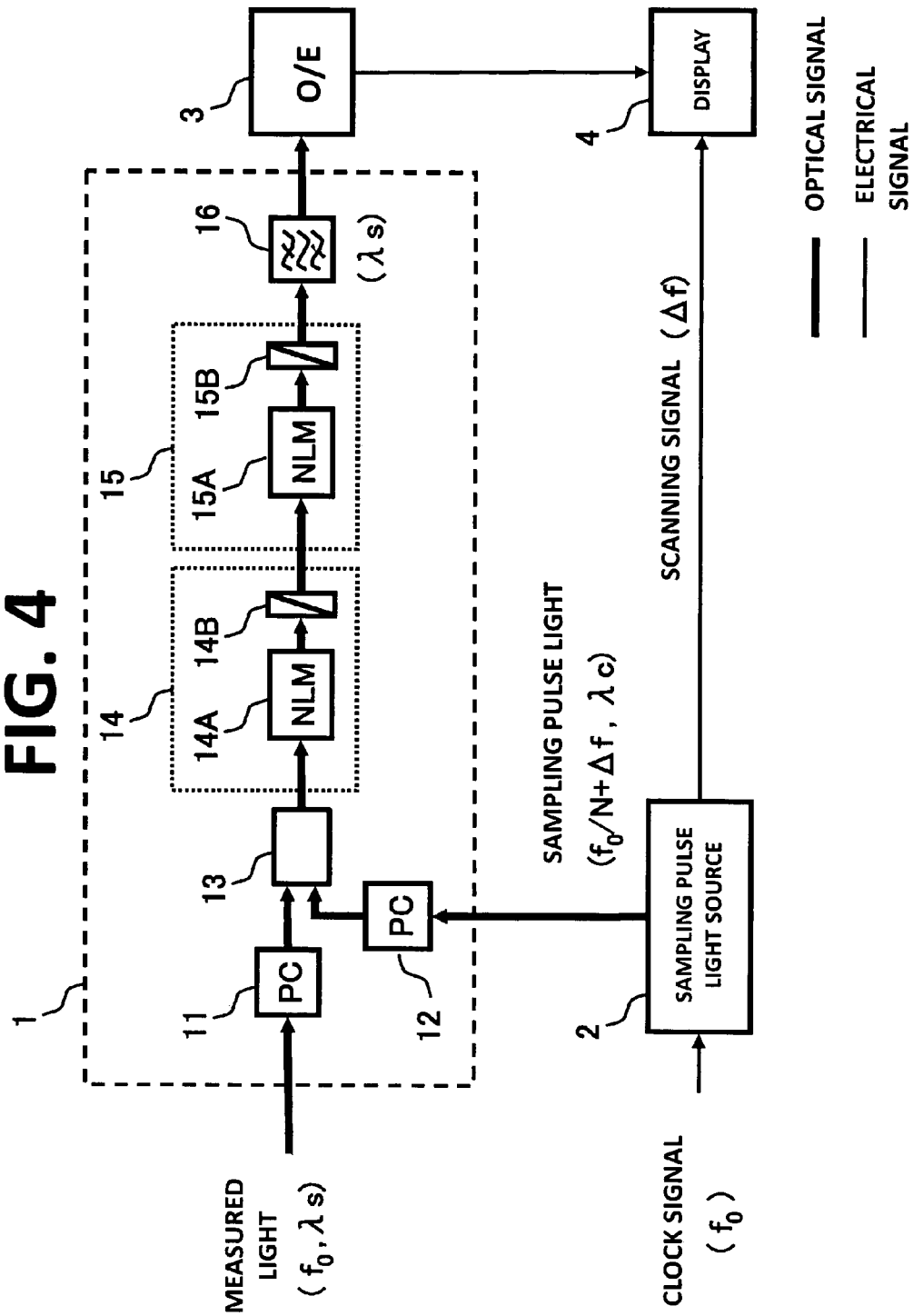
FIG. 4 is a diagram illustrating a configuration of an optical waveform monitoring apparatus according to an embodiment.

FIG. 4 is a block diagram illustrating a configuration of an optical waveform monitoring apparatus according to an embodiment.

In FIG. 4, the optical waveform monitoring apparatus has an optical gate section which uses, for example, the optical switch 1 illustrated in FIG. 1 described above, an optical sampling pulse generator 2 for supplying an optical sampling pulse to the optical switch 1, a photoelectric converter 3 for converting light output from the optical switch 1 into an electric signal, and a waveform display 4 for displaying a waveform of an electric signal output from the photoelectric converter 3.

The optical sampling pulse generator 2 uses a synchronous clock signal having a frequency of $f_0$ synchronized with light to be measured having a repletion rate of $f_0$ input to the polarization controller 11 of the optical switch 1, so as to frequency-divide the synchronized clock signal by N. The optical sampling pulse generator 2 also shifts the frequency of the synchronous clock signal by a frequency $\Delta f$ for sweep and thus generates a signal at a sampling frequency ($f_0/N+\Delta f$). Then, the optical sampling pulse generator 2 generates an optical sampling pulse having a wavelength of $\lambda c$, which is different from the wavelength $\lambda s$ of the light to be measured, by driving a short pulse light source (not shown) in accordance with the sampling frequency and outputs the optical sampling pulse to the polarization controller 12 of the optical switch 1. Note that the light to be measured and the optical sampling pulse correspond to signal light and control light, respectively, in the above optical switch 1 illustrated in FIG. 1. The synchronous clock signal to be supplied to the optical sampling pulse generator 2 is assumed to be generated from the light to be measured using a known clock extraction technique disclosed, for example, in Japanese Unexamined Patent Application Publication No. 2006-129035.

The photoelectric converter 3 converts the light to be measured (monitor light) sampled, for example, in the optical switch 1 into an electric signal using a optical receiving device and then converts the amplitude of the electric signal into a digital signal using a sampling frequency signal for output.

The waveform display 4 receives the digital signal output from the photoelectric converter 3 as vertical axis input and receives a sweep signal $\Delta f$ from the optical sampling pulse generator 2 as horizontal axis input, so as to display the waveform of the monitor light.

In the optical waveform monitoring apparatus having the above configuration, the light to be measured of the repetition rate $f_0$ and the wavelength $\lambda s$ and the optical sampling pulse of the sampling frequency ($f_0/N+\Delta f$) synchronized with the light to be measured and the wavelength $\lambda c$ ($\neq \lambda s$) are input to the optical switch 1. In the optical switch 1, the polarization state of the light to be measured is controlled by the polarization controller 11 so as to be a linear polarization state in which the polarization direction of the light to be measured is orthogonal to the direction of the transmission axis of the polarizer 14B of the first optical switching unit 14, and the polarization state of the optical sampling pulse is controlled by the polarization controller 12 so that the polarization direction of the optical sampling pulse is angled at 40 to 50 degrees with respect to the polarization direction of the light to be measured. Then, the light to be measured and the optical sampling pulse output from the polarization controllers 11 and 12 are multiplexed by the directional coupler 13 and input to the nonlinear medium 14A of the first optical switching unit 14. With this arrangement, the light to be measured and noise components are intercepted by the first and second optical switching units 14 and 15 when no optical sampling pulse is present, according to the operation principle of the optical switch 1. On the other hand, when an optical sampling pulse is present, the light to be measured transmits through, in sequence, the first and second optical switching units 14 and 15 and the wavelength filter 16 and is output from the optical switch 1. Then, the light to be measured which has been sampled in the optical switch 1 is converted into an electric signal in the photoelectric converter 3, and then the amplitude of the electric signal is A/D converted. The resultant digital signal is supplied to the waveform display 4 and swept through the frequency $\Delta f$, such that an actual waveform of the light to be measure is displayed on the waveform display 4.

According to the above optical waveform monitoring apparatus, sampling of the light to be measured in the optical switch 1 is performed with a high signal light extinction ratio without being substantially affected by noise components, enabling very high precise monitoring of a signal light waveform.

Now, an example of application of the above optical waveform monitoring apparatus illustrated in FIG. 4 will be described.

Figure 5:
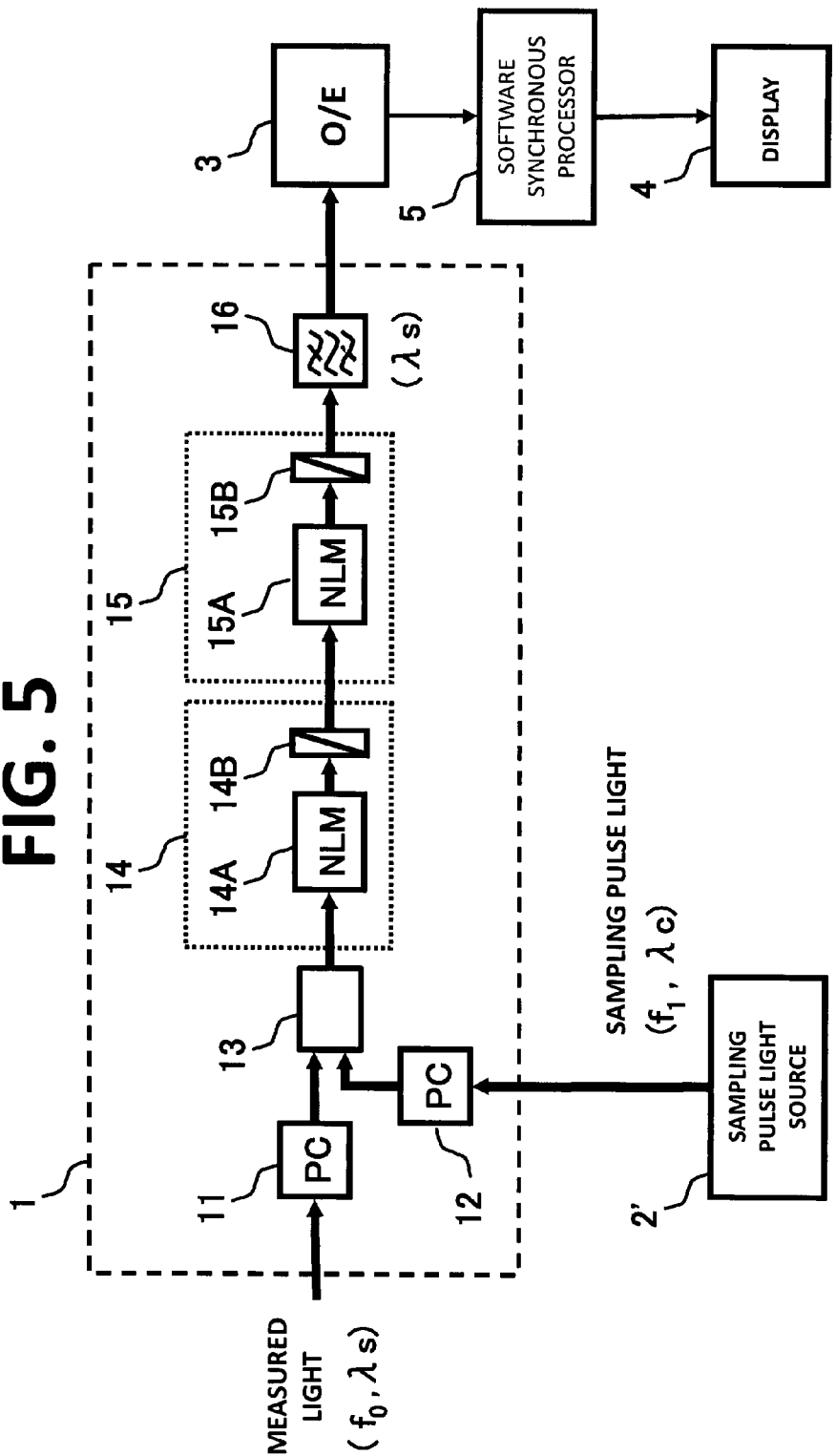
FIG. 5 is a diagram illustrating a configuration of an optical waveform monitoring apparatus according to another embodiment.
Figure 6:
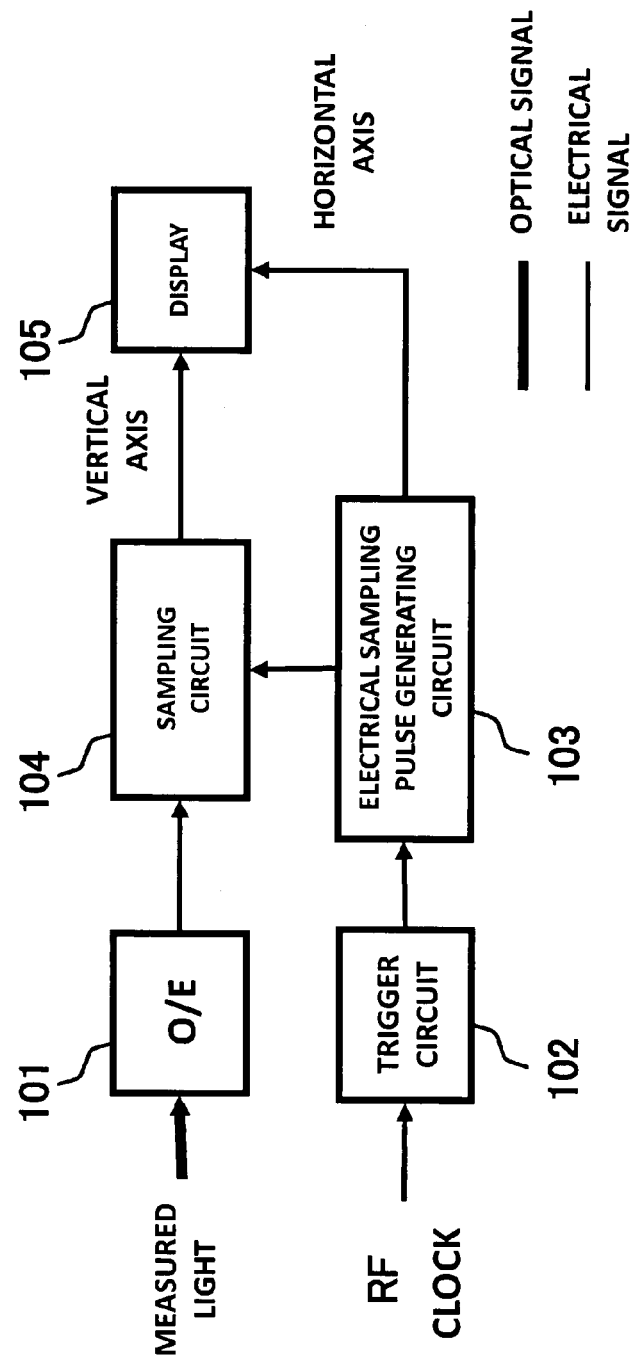
FIG. 6 is a diagram illustrating an example of a configuration of a common optical waveform monitoring apparatus.
Figure 7:
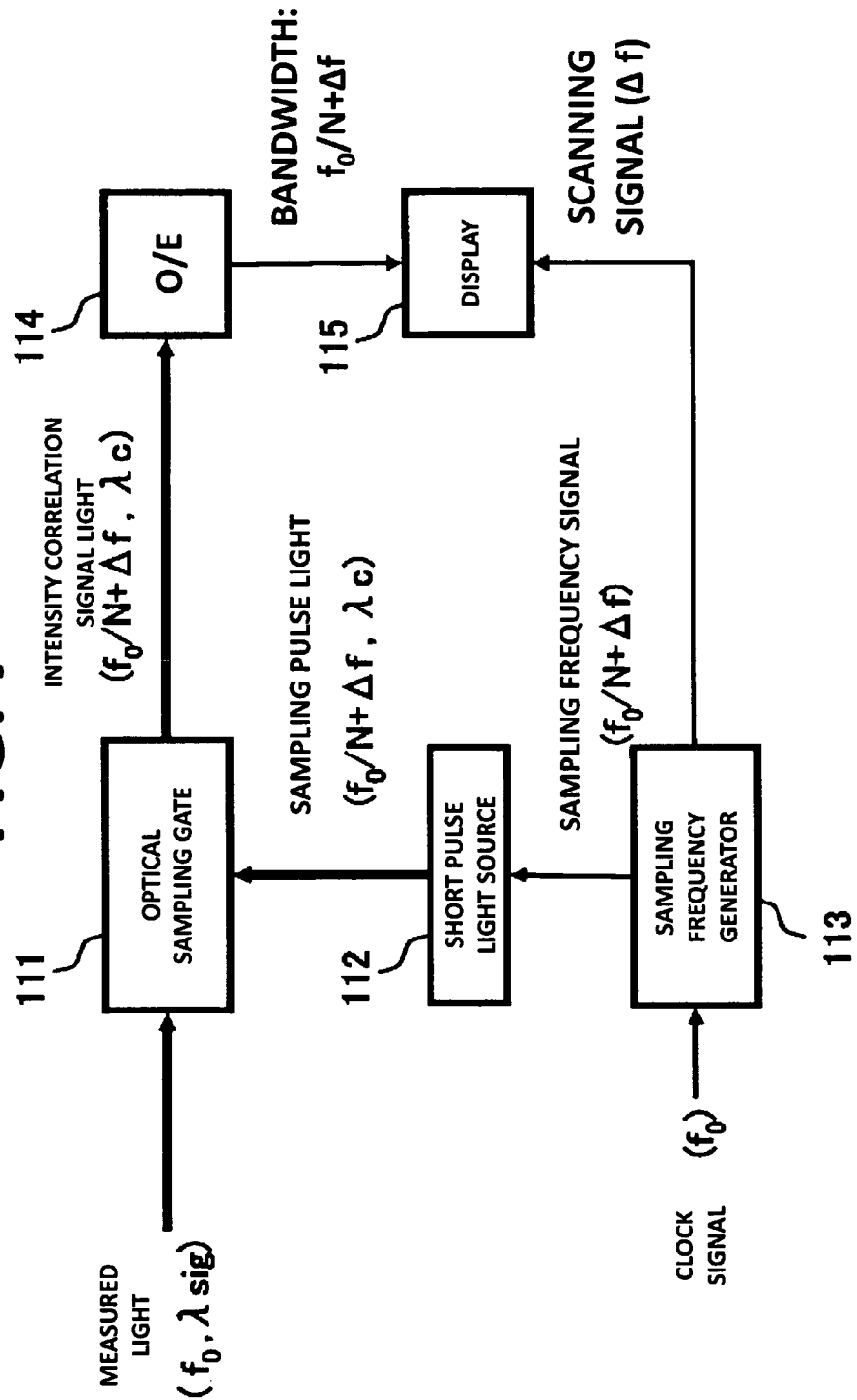
FIG. 7 is a diagram illustrating an example of a configuration of a conventional optical waveform monitoring apparatus which uses an optical sampling technique.

FIG. 5 is a block diagram illustrating a configuration of an optical waveform monitoring apparatus according to another embodiment.

The configuration of the optical waveform monitoring apparatus in FIG. 5 is different from the configuration illustrated in FIG. 4 described above in that the configuration in FIG. 5 includes a software synchronous processor 5, and an electric signal output from the photoelectric converter 3 is supplied to the waveform display 4 after being processed in the software synchronous processor 5. With this arrangement, a optical sampling pulse having a sampling frequency $f_1$ and a wavelength of $\lambda c$ is generated by a sampling pulse light source 2' without using a synchronous clock signal, enabling monitoring of a waveform of light to be measured.

The software synchronous processor 5 extracts synchronous clock information of light to be measured from an electric signal output from the photoelectric converter 3 using an algorithm which adopts a known software synchronization technique disclosed in, for example, an article: T. Kiatchang, et al., "Real-time all-optical waveform sampling using a free-running passively mode-locked fiber laser as the sampling pulse source," OFC 2006, OWN1, 2006. The software synchronous processor 5 then displays the waveform of the light to be measured on the waveform display 4 in accordance with the information.

The use of the software synchronous processor 5 described above permits monitoring of a wavelength of light to be measured regardless of whether or not the light to be measured and an optical sampling pulse input to the optical switch 1 are synchronized, which facilitates the implementation of the optical waveform monitoring apparatus. In addition, the optical waveform monitoring technique described in the above article employs a configuration in which the waveform of intensity correlation signal light (idler light) having a wavelength different from the light to be measured is monitored through software synchronous processing. This configuration requires a bandwidth of an optical sampling gate that is at least two times wider than the wavelength bandwidth of the light to be measured. On the other hand, according to the configuration of the embodiment illustrated in FIG. 5, the waveform of intensity correlation signal light having the same wavelength as the light to be measured is monitored through software synchronous processing. This configuration has an advantage that the wavelength bandwidth required for each optical component constituting the optical switch 1 (optical sampling gate) may be approximately equal to the bandwidth of the light to be measured.

The main features of the embodiment which have been described herein will be listed below.

According to the optical switch of the embodiment, the second nonlinear medium and the second polarizer are arranged downstream of the first polarizer. This arrangement can significantly decrease the level of noise output from the optical switch when no control optical pulse is present, as compared with a conventional optical switch. Thus, a signal light extinction ratio can be improved, and enhanced switch characteristics can be obtained. Further, in the optical waveform monitoring apparatus that uses the above optical switch as the optical sampling gate section, sampling of light to be measured in the optical gate section can be performed with a high optical signal extinction ratio while not being substantially affected by noise components. This allows monitoring of a waveform of the light to be measured with very high precision.

What is claimed is:

1. An optical switch, comprising:
   a coupler for coupling a signal light and a control pulse light which is different in wavelength and polarization direction from the signal light, the coupler outputting the signal light and the control pulse light;
   a first nonlinear medium for transmitting the signal light outputted from the coupler and the control pulse light outputted from the coupler, the first nonlinear medium for amplifying the signal light in accordance with the polarization direction of the control pulse light by nonlinear effect;
   a first polarizer positioned after the first nonlinear medium, the first polarizer having a transmission axis which is orthogonal with the polarization direction of the signal light before transmitting the first nonlinear medium, the first polarizer outputting a component light in a signal light and the control pulse light in parallel with the transmission axis of the first polarizer;
   a second nonlinear medium for transmitting the signal light outputted from the first polarizer and the control pulse light outputted from the first polarizer, the second nonlinear medium for changing polarization stats of the signal light by nonlinear effect; and
   a second polarizer positioned after the second nonlinear medium, the second polarizer having a transmission axis in accordance with a changing status angle of the second nonlinear medium, the second polarizer outputting a signal light and a control pulse light in parallel with the transmission axis of the second polarizer.

2. An optical switch according to the claim 1 further comprising a filter for filtering the signal light from the second polarizer.

3. An optical switch according to the claim 1, wherein the control pulse light has a power capable of optical-parametric-amplifying in the first nonlinear medium and rotating 90 degree of the polarization direction of signal light in the second nonlinear medium.

4. An optical switch according to the claim 1 further comprising a polarization controller for controlling a polarization state of the signal light before inputting the coupler so as to be in the orthogonal direction with the transmission axis of the first polarizer.

5. An optical switch according to the claim 4, wherein the polarization controller is controlled on the basis of the output optical power of the signal light outputted from the second polarizer.

6. An optical switch according to the claim 1 further comprising a polarization controller for controlling a polarization state of the control pulse light before inputting the coupler so as to be angled at 40 to 50 degrees with respect to the polarization direction of the signal light.

7. An apparatus for sampling a measurement light, comprising:
   a sampling pulse light source for generating an optical sampling pulse for sampling the measurement light;
   a coupler coupling a measurement light and a optical sampling pulse with different in wavelength and polarization direction from the measurement light, the coupler outputting the signal light and the optical sampling pulse;
   a first nonlinear medium for transmitting the measurement light outputted from the coupler and the optical sampling pulse outputted from the coupler, the first nonlinear medium for amplifying the measurement light in the polarization direction of the optical sampling pulse by nonlinear effect;
   a first polarizer positioned after the first nonlinear medium, the first polarizer having a transmission axis which is orthogonal with the polarization direction of the measurement light before transmitting the first nonlinear medium, the first polarizer outputting a component light in a measurement light and the optical sampling pulse in parallel with the transmission axis of the first polarizer;
   a second nonlinear medium for transmitting the measurement light outputted from the first polarizer and the optical sampling pulse outputted from the first polarizer, the second nonlinear medium for changing status of the measurement light by nonlinear effect;
   a second polarizer positioned after the second nonlinear medium, the second polarizer having a transmission axis in accordance with a changing status angle of the second nonlinear medium, the second polarizer outputting a measurement light and an optical sampling pulse in parallel with the transmission axis of the second polarizer.

8. An apparatus according to the claim 7, wherein the sampling pulse light source generates the sampling pulse light being synchronized the measurement light and having a predetermined sampling frequency and a different wavelength with respect to the measurement light.

9. An apparatus according to the claim 7 further comprising:
   a photoelectric convertor for converting the measurement light into an electrical signal; and
   a display for displaying the electrical signal having a waveform from the photoelectric convertor.

10. An apparatus according to the claim 9 further comprising a software synchronous processor for processing the electrical signal, for extracting synchronous clock information from the electrical signal and for providing display information in connection with the synchronous clock information to the display.

* * * * *

UNITED STATES PATENT AND TRADEMARK OFFICE
CERTIFICATE OF CORRECTION

| | | |
|---|---|---|
| PATENT NO. | : 7,853,145 B2 | Page 1 of 1 |
| APPLICATION NO. | : 11/987582 | |
| DATED | : December 14, 2010 | |
| INVENTOR(S) | : Fumio Futami et al. | |

It is certified that error appears in the above-identified patent and that said Letters Patent is hereby corrected as shown below:

Column 11, Lines 50-51, please remove "polarization stats of the signal light" and insert -- polarization status of the signal light --.

Signed and Sealed this
Fourteenth Day of June, 2011

David J. Kappos
*Director of the United States Patent and Trademark Office*